United States Patent Office 3,658,756
Patented Apr. 25, 1972

3,658,756
THERMOPLASTIC POLYURETHANES PREPARED FROM CAPROLACTONE POLYESTERS AND METHOD OF PREPARATION
Franz Gottfried Reuter, Hannover, Germany, assignor to Elastomer AG., Chur, Switzerland
No Drawing. Continuation-in-part of application Ser. No. 814,538, Apr. 9, 1969, which is a continuation-in-part of applications Ser. No. 764,519, Oct. 2, 1968, Ser. No. 545,526, Apr. 21, 1966, Ser. No. 570,061, Aug. 3, 1966, Ser. No. 701,218, Jan. 29, 1968, Ser. No. 722,514, Mar. 18, 1968, and Ser. No. 701,739, Mar. 6, 1968. This application June 5, 1969, Ser. No. 830,860
The portion of the term of the patent subsequent to Aug. 4, 1987, has been disclaimed
Int. Cl. C08g 22/10
U.S. Cl. 260—47 CB  10 Claims

ABSTRACT OF THE DISCLOSURE

A method for making a thermoplastic polyurethane from the esterification product of a hydroxy caproic acid, a chain extender and an organic diisocyanate.

This invention relates generally to polyurethanes and, more particularly, to a novel method of making a thermoplastic polyesterurethane. This application is a continuation-in-part of my application Ser. No. 814,538 filed Apr. 9, 1969 now abandoned which is a continuation-in-part of Ser. No. 764,519 filed Oct. 2, 1968, now abandoned, Ser. No. 545,526 filed Apr. 21, 1966, now abandoned, Ser. No. 570,061 filed Aug. 3, 1966, now abandoned, Ser. No. 701,218 filed Jan. 29, 1968, now abandoned, Ser. No. 722,514 filed Mar. 18, 1968, now abandoned, and Ser. No. 701,739 filed Mar. 6, 1968, now abandoned.

It has been proposed heretofore to prepare polyurethanes adapted to be processed by thermoplastic processing methods such as extrusion, compression molding or the like. Such products are obtained by reacting a hydroxyl terminated polyester, polyether or the like and a chain extender such as a glycol with an organic diisocyanate and interrupting the reaction before a product which is no longer processable by thermoplastic methods has been produced. A process of this type is disclosed, for example, in U.S. Pat. 3,214,411. In that process, a polyester prepared by esterification of a dicarboxylic acid and a glycol is used as the polyol. The product obtained after thermoplastic processing a polyester polyurethane of this type has relatively poor hydrolysis resistance and compression set.

It is, therefore, an object of this invention to provide an improved process for making a thermoplastic polyurethane. Another object of this invention is to provide a method for making a thermoplastic polyurethane having improved hydrolytic stability. Still another object of the invention is to provide a thermoplastic polyurethane having improved compression set characteristics and other improved physical characteristics over thermoplastic polyurethanes prepared from the esterification product of a dicarboxylic acid and a glycol. A still further object of the invention is to provide a novel method for making a polyesterurethane.

The foregoing objects and others which will become apparent from the following description are accomplished in accordance with this invention, generally speaking, by providing a process wherein a hydroxycaproic acid or lower alkyl hydroxycaproate is reacted with a glycol to form a substantially linear polycaprolactone ester and this ester is reacted along with a hydroxyl terminated chain extender with an organic diisocyanate under conditions which produce a thermoplastic polyurethane. A hydroxycaproic acid may be prepared by hydrolysis of a caprolactone. The hydrolysis product contains dimers and higher oligomers mixed with the hydroxycaproic acid. This mixture may be esterified to provide a polyester which is reacted in accordance with this invention with an organic diisocyanate to make a thermoplastic polyurethane.

In my earlier applications referred to above, a process is described for making thermoplastic polyurethanes from a hydroxyl terminated polycaprolactone. In accordance with that process, the polycaprolactone and a chain extender are reacted with an organic diisocyanate under conditions which produce a solid polyurethane which can be processed by thermoplastic shaping methods. The same general processing steps are involved here except that of the various hydroxyl polycaprolactones which can be reacted with an organic diisocyanate only hydroxycaproic acids and oligomers thereof and lower alkyl hydroxycaproates are contemplated.

In one embodiment of the invention, a lactone is hydrolyzed or alcoholized to the corresponding hydroxy acid or ester and the resulting hydrolyzate or alcoholyzate including any oligomers of the acid formed by the hydrolysis or alcoholysis is esterified with a glycol. The polyester thus obtained is used as the polyol to make a thermoplastic polyurethane.

Taking the hydrolysis of ε-caprolactone as an example, the production of hydroxycaproic acid

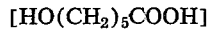
$$[HO(CH_2)_5COOH]$$

is accompanied by the production of dimers and higher oligomers by the condensation of the hydroxycaproic acid and/or by reaction of hydroxycaproic acid with ε-caprolactone.

The hydrolysis of ε-caprolactone or a lower alkyl-substituted ε-caprolactone, or mixtures thereof, may be accomplished by heating it with water with or without a catalyst. Excess water favors a good yield of hydroxycaproic acid. Heating one mole ε-caprolactone or the like with at least 5 moles water to a temperature of about 100° C. is used when it is desired to have large amounts of hydroxycaproic acid. The product thus obtained contains up to about 90% of the hydroxy acid and about 10% hydroxy acid oligomers. It has been found, however, that even though up to 95% of the hydrolysis product may be hydroxycaproic acid, it is difficult to prevent dimerization or the formation of higher oligomers upon standing even at room temperature. Since these oligomers are esterifiable along with the hydroxy acid, it is often more advantageous to use less water, tolerate the oligomers and have less water to remove by distillation. Ratios of just over 1 to 1 to 5 to 1 water to caprolactone are therefore contemplated. Hydrochloric acid or a cation exchange resin such as a sulfonated synthetic resin on a polystyrene matrix may be used as the catalyst. Suitable catalysts can be purchased under the trade names Amberlite IR-120H, Dowex 50 and Duolite C-25. The polyester is prepared by heating the hydrolyzate or alcoholyzate with a lower alkylene glycol such as, for example, ethylene glycol, 1,4-butanediol, diethylene glycol, propylene glycol or the like. Conventional esterification catalysts such as tetrabutyl titanate, dibutyltin dilaurate, dibutyltin oxide or lead oxide may be used. The water or alcohol formed during esterification is removed by distillation.

An alcohol such as, for example, methanol, ethanol isobutyl alcohol and the like may be used instead of water. Alcoholysis of a lactone such as alkyl-ε-caprolactone produces the corresponding alkyl-ε-hydroxycaproate. The alcoholysis can be achieved by following essentially the same procedure as the hydrolysis described herein except for the substitution of an alcohol for water. From about 1 to 5 moles alcohol per mole lactone are preferred. Acidic catalysts such as hydrogen chloride are preferred.

After excess alcohol has been removed by distillation, the resulting caproate may be used to prepare a polyester by transesterification. The molecular weight of the polyester is preferably from about 800 to about 3000 with best results being obtained when the molecular weight is about 2000.

The polyester should be a substantially linear hydroxyl terminated polycaprolactone ester having a molecular weight of from about 800 to about 3000 and preferably about 2000. The acid number of the polyester should be less than 10 and preferably less than 1. The hydroxyl number should be from about 38 to about 112.

In practicing the invention, the hydroxyl polycaprolactone ester and a glycol chain extender having a molecular weight below about 560 are reacted substantially simultaneously with an organic diisocyanate. Preferably, the polycaprolactone ester and chain extender are mixed together first and this mixture is then mixed with the organic diisocyanate at a temperature of from about 80° C. to about 160° C. After the reaction has proceeded to the point where the liquid reaction mixture is viscous but before solidification, the reaction mixture is spread over a surface in a relatively thin layer (about 1/8 inch to about 3/8 inch thick) where it is maintained at from about 80° C. to about 160° C. until solidification. Shortly after solidification, the solid product is rapidly cooled below reaction temperature and then to room temperature. The cooling interrupts the chemical reaction before the product is no longer processable by thermoplastic shaping methods. The product is removed from the supporting surface and broken up into particles in which condition it is stored at room temperature for about 6 weeks or it is heated for about 3 days at 80° C. to age the product. The product can then be comminuted or granulated to form particles suitable for use in thermoplastic processing equipment.

Any suitable organic diisocyanate can be used such as, for example, an 80% 2,4 and 20% 2,6-toluylene diisocyanate, 1,5-naphthylene diisocyanate, 1,4-diethylbenzyl-β,β'-diisocyanate or other suitable aromatic, aliphatic or cycloaliphatic diisocyanate disclosed in U.S. Pat. Re. 24,514, but it is preferred to use 1,6-hexamethylene diisocyanate or diphenylmethane-4,4'-diisocyanate. Preferably, the diphenylmethane - 4,4'-diisocyanate is added to the reaction mixture in the form of solid particles rather than as a melt. The ratio of isocyanate to hydroxyl groups in the reaction mixture should be from about 1 to 1 to about 1.3 to 1 and most preferably within the range from about 1.05 to 1.09 —NCO per —OH. Preferably, the ratio of —NCO to —OH in the chain extender should be from about 1.1 to about 1.3.

Any suitable glycol having a molecular weight below about 560 may be used as a chain extender. For example, the chain extender may be 1,6-hexanediol, 1,12-dodecanediol, 1,5-pentanediol, diethylene glycol or the like, but best results have been obtained with 1,4-butanediol or a glycol having the formula

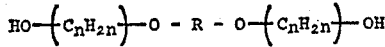

so these chain extenders are preferred. In the formula, R may be phenylene or naphthylene and $n$ is an integer of from 1 to 12. Hydroquinone diglycol ether is the preferred chain extender having this formula but the alkylene radical may be propylene, butylene, hexylene or the like.

Any suitable plasticizer, pigment, dye, filler or the like may be included in the product if desired.

The product provided by this invention may be used to make various polyurethane articles including shoe lifts, bearings, oil seals and the like.

In order to better describe and to further clarify the invention, the following are specific examples thereof in which the parts are by weight unless otherwise specified.

EXAMPLE I

A poly(hydroxycaproic acid) ester is prepared by heating at about 100° C. a mixture of about 1910 parts ε-caprolactone and about 630 parts water using Amberlite IR-120H cation exchange resin as a catalyst. The reaction mixture is maintained at a temperature of about 120° C. until the lactone is hydrolyzed and contains at least about 80% hydroxycaproic acid. The product is then esterified by reaction with 1,4-butanediol. The esterification is accomplished by heating a mixture containing the hydrolysis product with 1,4-butanediol until a molecular weight of about 2000 and an acid number less than 1 is obtained. Water is stripped by distillation to produce a substantially anhydrous polyester.

About 1000 parts of the substantially anhydrous poly (hydroxycaproic acid)ester are mixed at about 150° C. with about 50 parts 1,4-butanediol. The resulting mixture is mixed with about 210 parts by weight 1,6-hexamethylene diisocyanate and stirred until a viscous liquid is obtained. The reaction product is spread over a heated surface in a layer about 1/4 inch thick while it is still in the liquid stage but after the viscosity has increased and is permitted to stand for about 10 minutes at about 150° C. After solidification, it is cooled to room temperature to stop chemical reaction. The resulting solid product is broken up into pieces and stored for about 48 hours at room temperature. It is then granulated and stored for about 3 days at 80° C. It is now ready to be processed by thermoplastic shaping methods such as by extrusion, compression molding or the like.

EXAMPLE II

About 1910 parts ε-caprolactone and about 306 parts water are refluxed at atmospheric pressure for about 30 minutes to hydrolyze the ε-caprolactone. About 92 parts 1,4-butanediol are added to the resulting mixture of hydroxycaproic acid and oligomers thereof and water is distilled from the reaction mixture through a fractional distillation column at atmospheric pressure. Nitrogen is bubbled slowly through the boiling liquid when the temperature has reached about 210° C. to about 215° C. and the pressure within the vessel is gradually reduced to maintain steady distillation of water through the fractionating column with the temperatture maintained at about 210° C. to about 215° C. Fractional distillation of water is continued under reduced pressure with the temperature at from about 210° C. to about 215° C. until the acid number is less than 0.5 and the molecular weight is about 2000. The vacuum is carefully controlled to avoid distillation of 1,4-butanediol.

About 1000 parts of the substantially anhydrous esterification product are mixed at about 150° C. with about 50 parts 1,4-butanediol. The resulting mixture is mixed with about 210 parts by weight 1,6-hexamethylene diisocyanate and stirred until a viscous liquid is obtained. The reaction product is spread over a heated surface in a layer about 1/4 inch thick while it is still in the liquid stage but after the viscosity has increased and is permitted to stand for about 10 minutes at about 150° C. After solidification, it is cooled to room temperature to stop chemical reaction. The resulting solid product is broken up into pieces and stored for about 48 hours at room temperature. It is then granulated and stored for about 3 days at 80° C. It is later processed by thermoplastic shaping methods such as by extrusion, compression molding or the like.

EXAMPLE III

About 1000 parts of substantially anhydrous polycaprolactone ester prepared by the process of Example II are mixed at about 110° C. with about 600 parts by weight of diphenylmethane-4,4'-diisocyanate and reacted to form an —NCO terminated urethane. About 363 parts 1,12-dodecanediol are mixed and reacted with the urethane at about 120° C. while stirring well. After the viscosity of the liquid has increased appreciably but before the product has solidified, the mixture is poured as a thin layer of about ¼ inch thickness over a surface having a temperature about equal to that of the mixture. The layer is permitted to remain on the heated surface until solidification or for about 10 minutes. It is then cooled to room temperature to interrupt chemical reaction. The solid is removed from the surface, broken up into chunks and stored at room temperature overnight. It is then ground and the resulting granulate is stored for about 3 days at 80° C. It is extruded into oil-seal rings.

EXAMPLE IV

About 1000 parts of the substantially anhydrous esterification product of Example I are mixed at about 110° C. with about 325 parts 1,4-butanediol and about 17 parts bis (2,6-diisopropylphenyl) carbodiimide. About 1100 parts finely crystalline diphenylmethane-4,4'-diisocyanate are then added at about 82° C. The mixture is stirred for about 2 minutes and the partially reacted mixture is spread as a layer over the surface of a heated plate while it is still liquid where it remains for about 6 to 10 minutes at about 115° C. It is then cooled to room temperature. It is stripped from the plate, broken up into pieces and stored for about 24 hours at room temperature. It is comminuted by grinding and stored for about 3 days at 80° C. The product is injection molded to form a product having a hardness of about Shore D 64.

EXAMPLE V

Example IV is repeated except that about 357 parts 1,4-butanediol and about 1200 parts finely crystalline diphenylmethane-4,4'-diisocyanate are used.

EXAMPLE VI

About 114 parts ε-caprolactone and about 160 parts methanol and about 0.02 part dibutyltin dilaurate are refluxed until methylhydroxycaproate is formed. Excess methanol is then distilled from the product.

About 1400 parts of the product and about 110 parts 1,4-butane diol are heated with about 1 part tetraisopropyl titanate and methanol is distilled therefrom. Heating is continued at about 180° C. to 200° C. until the product has a molecular weight of about 2000 and the acid number is less than 0.5.

The resulting polyester is used to make a thermoplastic polyurethane by the process described in Example IV.

EXAMPLE VII

The polyester of Example VI is used to make a thermoplastic polyurethane as described in Example IV except about 68 parts hydroquinone diglycol ether are substituted for the 1,4-butanediol chain extender.

EXAMPLE VIII

About 1000 parts of the substantially anhydrous polyester of Example I, about 68 parts hydroquinone diglycol ether and about 2 parts trimethylol propane are reacted with about 1400 parts diphenylmethane-4,4'-diisocyanate at about 160° C. for about 2 minutes. The viscous liquid thus obtained is poured over a heated surface and maintained as a layer about ¼ inch thick at a temperature of 150° C. to 160° C. until solidification. It is then cooled to room temperature and stored for 24 hours. It is comminuted by grinding and stored another 3 days at about 80° C. It is then ready for thermoplastic processing.

Although the invention has been described in detail in the foregoing for the purposes of illustration, it is to be understood that such detail is solely for the purpose of illustration and that variations can be made therein by those skilled in the art.

The embodiments of the invention in which an exclusive property or privilege is claimed are defined as follows:

1. A thermoplastic polyurethane prepared by a process which comprises mixing a hydroxyl terminated polyester and a glycol having a molecular weight below about 560 with an organic diisocyanate, reacting the mixture until solidification thereof, and thereafter cooling the solid product below a temperature where significant chemical reaction will occur before it is no longer processable by thermoplastic methods; said polyester having been prepared by reacting a glycol with the reaction product of a caprolactone and water or a monohydric alcohol.

2. The product of claim 1 wherein the polyester has a molecular weight of at least about 800 and the chain extender is a glycol having the formula

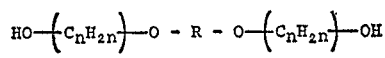

wherein R is phenylene or naphthylene and $n$ is an integer of from 1 to 12.

3. The product of claim 1 wherein the diisocyanate is diphenylmethane-4,4'-diisocyanate.

4. The product of claim 1 wherein the polyester has a molecular weight of from about 800 to about 3000 and the diisocyanate is diphenylmethane-4,4'-diisocyanate or 1,6-hexamethylene diisocyanate.

5. The product of claim 4 wherein the diisocyanate is solid particles of diphenylmethane-4,4'-diisocyanate at the time it is mixed with the other components.

6. In a process for making a thermoplastic polyurethane wherein a hydroxyl terminated polyester and a glycol having a molecular weight of below about 560 are mixed with an organic diisocyanate, the mixture is reacted until it solidifies and the resulting solid is cooled below a temperature where significant chemical reaction will occur before the product is no longer processable by thermoplastic methods, the improvement wherein said polyester is the esterification product of a glycol with the reaction product of a caprolactone and water or a monohydric alcohol.

7. The process of claim 6 wherein the —NCO to —OH ratio is from about 1.1 to about 1.3 —NCO per —OH.

8. The product obtained by extruding or injection molding the product of claim 1.

9. The product of claim 2 wherein the chain extender is hydroquinone diglycol ether.

10. The product of claim 1 wherein the polyester has been prepared from a mixture of hydroxy-caproic acid and its oligomers or a mixture of a lower alkylhydroxycaproate and its oligomers.

References Cited

UNITED STATES PATENTS

| | | | |
|---|---|---|---|
| 2,933,477 | 4/1960 | Hostettler et al. | 260—77.5 |
| 2,933,478 | 4/1960 | Young et al. | 260—77.5 |
| 3,051,687 | 8/1962 | Young et al. | 260—77.5 |

WILLIAM H. SHORT, Primary Examiner

L. L. LEE, Assistant Examiner

U.S. Cl. X.R.

260—37 N, 75 NP, 77.5 AN